United States Patent [19]

Werner et al.

[11] 3,942,554

[45] Mar. 9, 1976

[54] EXTENDABLE CRANE WITH FOLDING CONDUIT

[75] Inventors: Patrick S. Werner, Costa Mesa; Frank L. Nelson, Mira Loma, both of Calif.

[73] Assignee: Werner Corporation, Anaheim, Calif.

[22] Filed: Apr. 19, 1974

[21] Appl. No.: 462,317

[52] U.S. Cl. .................. 137/615; 212/144; 214/141

[51] Int. Cl.² B67D 5/02; B66C 17/00; B66C 23/00

[58] Field of Search ............ 137/615, 801; 285/168, 285/164; 212/55, 56, 144; 214/141

[56] References Cited

UNITED STATES PATENTS

| | | | |
|---|---|---|---|
| 2,650,718 | 9/1953 | Palmer | 212/56 |
| 3,445,004 | 5/1969 | Grider et al. | 212/55 |
| 3,451,427 | 6/1969 | Dollinger | 137/615 |
| 3,459,222 | 8/1969 | McElroy | 137/615 |
| 3,622,013 | 11/1971 | Swanson | 212/55 |
| 3,670,930 | 6/1972 | Irie | 137/615 X |
| 3,721,260 | 3/1973 | Stahmer | 137/615 X |

*Primary Examiner*—Martin P. Schwadron
*Assistant Examiner*—Robert J. Miller
*Attorney, Agent, or Firm*—Edward D. O'Brian

[57] ABSTRACT

It is known to construct various types of cranes such as swing-boom cranes employing extendable boom sections and hammerhead cranes with rotating, counter-balanced, cantilevered booms so that conduits extend between and are connected to parts of such cranes which are movable. Such structures may be improved by using as the conduit a plurality of rigid conduit sections connected together by rotary joints permitting said conduit sections to be rotated about parallel axes. Certain of these joints are located where the conduit is connected to parts of the crane. A rotary joint is also located between each adjacent connection of the conduit to the crane. The sections are dimensioned so that during operation of the crane the rigid sections cannot be moved so as to be aligned with one another. As a consequence of this the various portions of the conduit will fold in a desirable manner as the crane is operated.

7 Claims, 7 Drawing Figures

10 12 14 18 20 22 24 26 28 32 34 38 56 58 60 62 74

100 102 104 106 108 110 112 114 116 118 120 122 124 126 128 130 132

10
12
14
18
20
22
24
26
28
32
34
38
56
58
60
62
74

100
102
104
106
108
110
112
114
116
118
120
122
124
126
128
130
132

EXTENDABLE CRANE WITH FOLDING CONDUIT

BACKGROUND OF THE INVENTION

The invention set forth in this specification relates to the combination of what may be referred to as an extendable crane and a conduit for use in conveying material such as concrete.

It is well known to use conduits for conveying various materials such as concrete in combination with various types of cranes in the construction industry. Such combined structures are commonly employed to convey concrete to various locations in buildings, bridges and the like which are under construction. These structures may, however, be utilized for a wide variety of other purposes. The cranes employed with such structures may be constructed in a wide variety of different manners. It is considered that there is a lack of complete uniformity as to the terminology to be used in describing these various types of cranes. Many such cranes are of an extendable variety so that they can be extended in delivering material to any desired distance and/or height. Most commonly the cranes utilized in delivering pulverant material such as concrete are of two different types.

Probably the most common of these types may be referred to as rotary cranes employing a sectionalized swing-boom. In some of such cranes the sections of the boom are pivoted to one another so that the booms may be extended to an operative position by rotating the boom sections relative to one another. For many applications it is considered desirable to construct such cranes utilizing individual sections which may be moved linearly relative to one another. Frequently such extendable cranes are constructed so that the boom sections are telescoped within one another. Cranes of this type are commonly mounted on trucks in the construction industry so that they may be readily transported in a collapsed type configuration from one job site to another.

So-called hammerhead cranes constructed so as to utilize a rotating, counter-balanced, cantilevered boom section supported by a turntable on a tower are also commonly utilized in delivering concrete and the like. Such cranes employ one or more trolleys along the cantilevered boom and move these trolleys back and forth relative to the turntable and/or tower in delivering material to various locations.

A number of different conduit structures have been employed with these various types of cranes in delivering cement and other materials. Flexible hoses or conduits have frequently been employed in combination with these types of cranes. Such conduits are considered disadvantageous for this type of use for a variety of reasons which are considered relatively unimportant to an understanding of the present invention. In passing it should, however, be noted that such flexible conduits do not always fold in a convenient manner and are apt to move during the transportation of a crane to which they are attached.

The recognition of the problems encountered with flexible concrete delivery conduits has resulted in the development of a variety of different structures. It has been proposed to utilize flexible and rigid conduits in connection with sectionalized boom cranes in which the individual crane sections are rotated or pivoted with respect to one another in structures in which rotary joints in the conduit are located so as to be aligned with the axes of rotation between the boom sections. Structures of this type are considered to be somewhat undesirable from a commercial standpoint because of the inherent limitations as to the manner in which this type of crane structure can be operated.

SUMMARY OF THE INVENTION

It is believed that it will be apparent from the preceding discussion that there is need for new and improved extendable cranes used in combination with conduits. A broad objective of the present invention is to fulfill this need. The invention is intended to provide new and improved extendable cranes with folding conduits which are more desirable than prior related structures for a variety of reasons. Various objectives of the invention are to provide combined structures as indicated which can be manufactured with considerable little difficulty at a reasonable cost, which can be easily and conveniently utilized, which are capable of giving prolonged and reliable service with a minimum of maintenance and which may be easily transported as required during their utilization.

In accordance with this invention these and various other objectives of the invention as will appear from a detailed consideration of the remainder of this specification are achieved in the combination of a crane including at least one part which is movable relative to another part so that the spacing between the parts can be varied and a conduit extending between and being connected to the parts by the improvement which comprises: the conduit consisting of a plurality of rigid sections connected together by rotary joints, one of the rotary joints being positioned at each location where the conduit is connected one of the parts, one of the joints being positioned between the adjacent rotary joints which are located where the conduit is connected to the parts, the rotary joints all having parallel axes of rotation and the rigid sections being dimensioned so that they cannot be rotated to an aligned position during the operation of the crane.

BRIEF DESCRIPTION OF THE DRAWINGS

Inherently a summary such as the preceding is incapable of indicating many important facets and features of an invention such as is set forth in this specification. Further information relative to this invention is best indicated with reference to the accompanying drawings in which.

Figures 1, 2, 3, 4, 5:
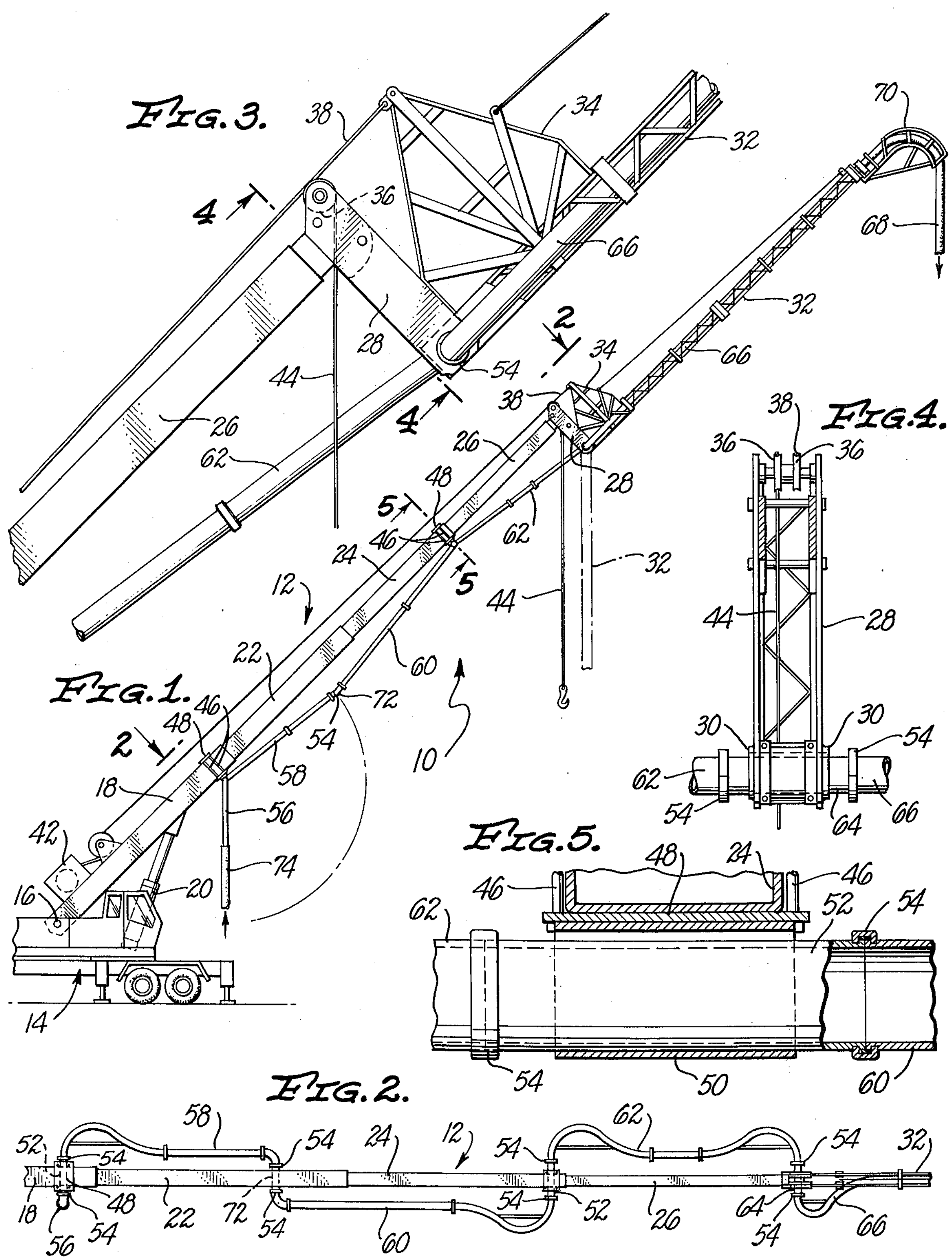
FIG. 1 is a side elevational view of a presently preferred embodiment or form of the invention employing a rotary crane having a sectionalized, extendable, telescopic swing-boom which is shown in this figure in an extended position.
FIG. 2 is a fragmentary plan view of part of the structure shown in FIG. 1 as indicated by the line 2—2 of FIG. 1.
FIG. 3 is a fragmentary enlargement of a mounting and actuator for the crane shown in FIG. 1 which is removable from the remainder of the crane as it is transported.
FIG. 4 is a cross-sectional view taken at line 4—4 of FIG. 3.
FIG. 5 is a partial cross-sectional view taken at line 5—5 of FIG. 1.

The various structures shown in the drawings utilize the essentially intangible concepts or principles of the invention as are defined in the appended claims. These concepts or principles can be easily incorporated within various differently constructed devices and/or utilized with routine engineering skill on the basis of the disclosure embodied within this specification.

DETAILED DESCRIPTION

In FIG. 1 of the drawings there is shown a combined crane and conduit structure 10 in accordance with this invention. This structure includes a telescopic crane 12 of known design which is mounted upon a truck 14 so that it may be conveniently transported from one location to another. The crane 12 is mounted upon this truck 14 through the use of a conventional pivot structure 16 connecting a lower-most section 18 of the crane 12 to the truck 14. A conventional hydraulic actuator 20 also connects this section 18 to the truck 14 so that the section 18 may be pivoted up and down in a known manner. If desired the portion (not separately numbered) of the truck 14 holding the pivot 16 may be pivotally mounted so as to be capable of being rotated about a vertically extending axis.

The crane 12 also includes a plurality of other telescopic sections 22, 24 and 26 which are adapted to be slid within one another along a linear path in a known manner. The last of these sections 26 in the structure shown carries a downwardly extending support structure 28. This support structure 28 is provided with conventional bearings 30 which rotatably support a boom 32 so that this boom 32 may be rotated to a position in which it extends parallel to the sections 22, 24 and 26. A "gantry" type of superstructure 34 is mounted on the boom 32 adjacent to the structure 28.

The position of the boom 32 is adapted to be controlled in a conventional manner through a cable 38 used in connection with a known control mechanism. This cable 38 passes over one of the pulleys 36 and is connected to the superstructure 34 so as to gain a leverage advantage facilitating rotation of the boom 32 to an operative position as shown in FIG. 1. In this operative position the superstructure 34 abuts against the support structure 28. If desired another cable 44 may be used in connection with one of the pulleys 36 for lifting or similar purposes.

In accordance with this invention bolts 46 are used in connection with top and bottom plates 48 on the sections 18 and 24 for the purpose of supporting cylindrical housings 50. Each of these housings 50 holds a rigid pipe section 52. The ends of these pipe sections 52 are connected by conventional rotary pipe joints 54 to rigid conduit sections 56, 58, 60 and 62 as indicated in the drawings. A pipe section 64 corresponding to the section 52 is located on the support structure 28 along the axis of rotation of the boom 32. It is also connected by conventional rotary pipe joints 54 to the section 62 and to another elongated conduit 66 which extends along the length of the boom 32.

This conduit 66 preferably terminates in a flexible, downwardly directed discharge end 68 extending around a known curved support structure 70 carried by the end of the boom 32. Other short pipe sections 72 corresponding to the sections 52 are located between the adjacent ends of the sections 58 and 60 and are secured to these ends by other conventional rotary pipe joints 54. A conventional conduit 74 may be used to convey cement or the like into the conduit 56 in a known manner. The assembly of these sections, 56, 58, 60 and 62 and the various sections 62 and 72 in effect serve as a complete conduit used to convey material through the section 64 to the conduit 66.

Figure 6:
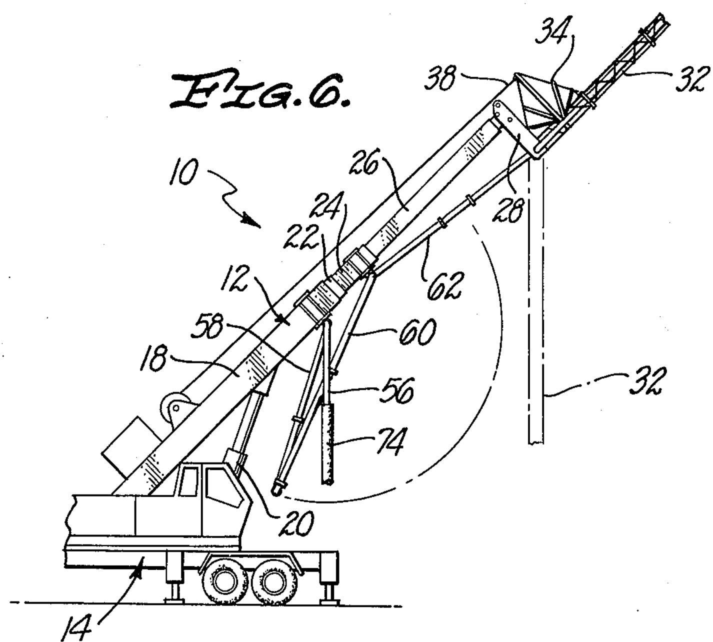
FIG. 6 is a view similar to FIG. 1 showing the positions of various parts in a collapsed and folded position.

This described structure is particularly desirable because of the manner in which it folds as the crane 12 is contracted in length by telescoping the sections 18, 22, 24 and 26 together. As this occurs the sections 58 and 60 will automatically fold with respect to one another to a position as shown in FIG. 6 of the drawings along an arc as indicated in dotted lines in FIGS. 1 and 6. In this folded position the sections 58 and 60 are, in a manner of speaking, "tucked under" or folded beneath the crane 12 in a convenient position.

In this position as indicated in FIG. 6 the entire structure can be readily moved from one location to another. During such movement the sections 56, 58, 60 and 62 will remain relatively stable because of their rigidity and the rigidity of the parts associated with them. For such movement it is preferred to either dismount the boom 32 or to allow this boom 32 to swing downwardly by gravity about the support structure 28 to a vertically extending position as indicated by the dotted parallel lines in FIG. 6. This is, of course, accomplished by releasing the tension on the cable 38.

In order to obtain the manner of operation described it is necessary that the rigid sections 58 and 60 be dimensioned so that their combined lengths are greater than the distance between the sections 52 when the crane 12 is fully extended. When these sections 58 and 60 are so dimensioned obviously they cannot be rotated so as to be aligned with one another as the crane 12 is extended. If the lengths of the sections 58 and 60 were equal to this distance between the sections 52 when the crane 12 is extended there is danger that gravity will not tend to swing the sections 58 and 60 in the desired manner as the crane 12 is retracted. Further, if the lengths of the sections 58 and 60 were less than the distance between the sections 52 these sections 58 and 60 would limit the amount to which the crane 12 is capable of being extended.

Another geometric relationship is considered important in obtaining the type of folding or tucking action indicated in the preceding discussion. To achieve this action the section 58 should be shorter than the section 60 and these sections 58 and 60 should be offset with respect to one another. When these sections are so dimensioned the adjacent ends of the sections 58 and 60 will swing generally underneath the section 18 of the crane 12. If the sections 58 and 60 were of the same length or if the section 58 was longer than the section 60 the adjacent ends of the sections 58 and 60 would tend to project to an undesired extent when the structure 10 is in a collapsed state ready to be moved. In some applications this would not be objectionable. However, in general, it is considered undesirable.

Figure 7:
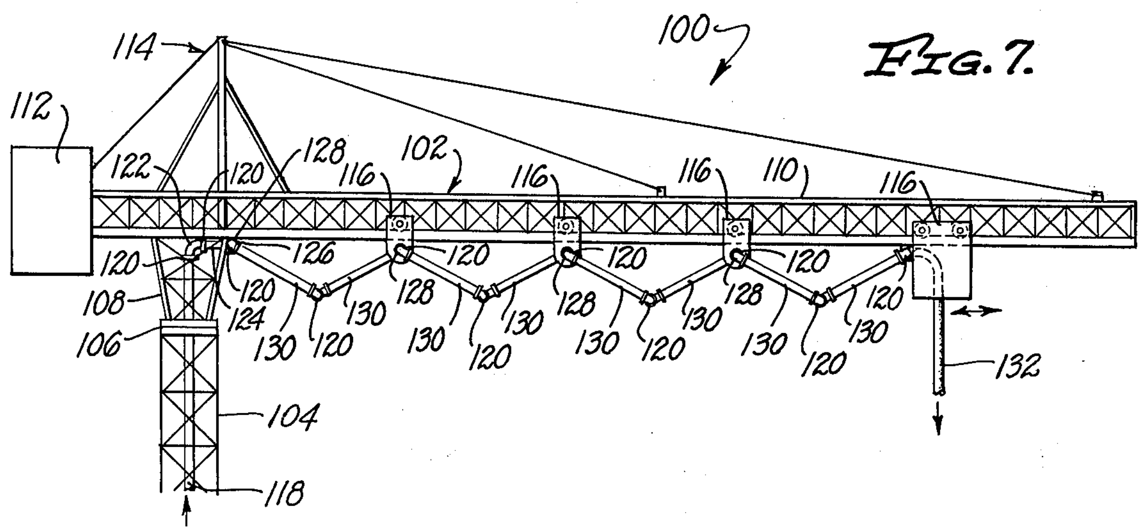
FIG. 7 is a side elevational view showing the manner in which the invention may be utilized with a hammerhead crane of a type as hereinafter described in detail.

In FIG. 7 of the drawing there is shown a modified crane and conduit structure 100 in accordance with this invention. This structure 100 utilizes what may be referred to as a hammerhead crane 102 employing a tower 104 having a turntable 106 which supports a base 108 attached to an elongated boom 110 which is cantilevered out so as to extend from one side of the base 108. A counter-balance 112 is secured to the boom 110 adjacent to the base 108. A conventional more or less A-frame of guy-wire stabilizer structure 114 is shown in use with the boom 110. This boom 110 supports a series of trolleys 116 in such a manner that these trolleys 116 may be moved along the length of the boom 110 in accordance with conventional practice.

A rigid conduit 118 extends upwardly through the tower 104 and the turntable 106 into the interior of the base 108. There the conduit 118 is connected by a conventional rotary coupling 120 to an elbow 122 which in turn is connected by another rotary coupling 120 to another elbow 124. If desired the two elbows 122 and 124 can be directly secured to one another. A small bracket 126 on the undersurface of the boom 110 supports a small conduit section 128 corresponding to the sections 52 previously described. Similar sections 128 are located on each of the trolleys 116. The elbow 124 and various offset rigid pipe or conduit sections 130 are secured to the sections 128 by rotary couplings 120 in the same manner as in the structure 10. The adjacent ends of the pipe sections 130 are further curved towards one another and are joined together by other rotary couplings 120. The section 128 held by the trolley 116 furtherest removed from the tower 104 is secured by a rotary (or rigid) coupling 120 to a downwardly directed discharge conduit 132.

It is believed that the use of the structure 100 will be obvious from the preceding discussion of the structure 10. As the trolleys 116 are moved in accordance with conventional practice the various interconnected sections 128 will either unfold to a configuration as indicated in FIG. 7 or will tend to fold together in a compact unit adjacent to the tower 104 in which all of these sections extend downwardly in nearly a vertical direction. These sections 130 and the various connections between them constitute a rigid conduit which is relatively immune from any problems which may be encountered regarding conduit movement as the discharge conduit 132 is moved towards or away from the tower 104 during the operation of the structure 100.

We claim:

1. In the combination of a crane including at least one part which is linearly movable relative to another part so that the spacing between the parts can be varied and a conduit extending between and being connected to said parts the improvement which comprises:

said conduit consisting of a plurality of rigid sections connected to one another by rotary joints permitting said sections to be rotated with respect to one another, one of said rotary joints being positioned at each location where said conduit is connected to one of said parts, one of said joints being positioned between each of the rotary joints which is located where said conduit is connected to said parts, said rotary joints all having parallel axes of rotation permitting said rigid sections to be rotated about said parallel axes, said rigid sections being dimensioned so that during the operation of said crane said sections between said rotary joints located where said conduit is connected to said crane cannot be rotated to an aligned position.

2. The combination claimed in claim 1 wherein:

said rigid sections are offset with respect to one another so as to facilitate folding of said rigid sections when the spacing between said parts is decreased.

3. A combination defined in claim 1 wherein:

said crane is a telescopic crane having sections which are adapted to be telescoped with respect to one another, at least one of said parts being one of said sections.

4. The combination claimed in claim 3 wherein:

said crane projects upwardly at an angle to the horizontal, the sections between two of said rotary joints positioned at adjacent locations where said conduit is connected to said parts are dimensioned so that the uppermost of said sections is longer than the lowermost of said sections so as to cause said sections to fold generally under said crane when the spacing between said parts is decreased.

5. The combination claimed in claim 1 wherein:

said rigid sections are offset with respect to one another so as to facilitate folding of said rigid sections when the spacing between said parts is decreased, said crane is a telescopic crane having sections which are adapted to be telescoped with respect to one another, at least one of said parts being one of said sections, said crane projects upwardly at an angle to the horizontal, the sections between two of said rotary joints positioned at adjacent locations where said conduit is connected to said parts are dimensioned so that the uppermost of said sections is longer than the lowermost of said sections so as to cause said sections to fold generally under said crane when the spacing between said parts is decreased.

6. The combination claimed in claim 1 wherein:

said crane includes a horizontally extending boom having at least one horizontally movable trolley located thereon, said one of said parts being said trolley.

7. The combination claimed in claim 1 wherein:

said crane includes a horizontally extending boom having a plurality of horizontally movable trolleys located thereon, and said conduit is attached to and supported by all of said trolleys.

* * * * *